United States Patent
Janssen et al.

[11] Patent Number: 5,232,131
[45] Date of Patent: Aug. 3, 1993

[54] FUEL-DISPENSING NOZZLE FOR DISPENSING HYDROCARBON FUEL

[75] Inventors: Sylvain Janssen, Neuilly; Jacques Fournier, Bretigny sur Orge, both of France; Frans de laHaye, The Hague, Netherlands

[73] Assignee: Schlumberger Industries, Montrouge, France

[21] Appl. No.: 640,152

[22] Filed: Jan. 11, 1991

[51] Int. Cl.$^5$ .............................................. B67D 3/00
[52] U.S. Cl. .................................... 222/528; 141/352;
 137/616.7; 239/538; 239/578; 222/556
[58] Field of Search ..................... 222/529, 531–533,
 222/536, 537, 548, 556, 528; 239/538, 578;
 137/616, 616.7; 141/351, 352, 354, 349, 362,
 387, 382

[56]  References Cited
 U.S. PATENT DOCUMENTS

| Re. 16,284 | 3/1926 | Spaeth | 141/382 X |
|---|---|---|---|
| 961,901 | 6/1910 | Seagrave | 137/616 |
| 1,286,517 | 12/1918 | Bradbury et al. | 222/533 X |
| 1,573,895 | 2/1926 | Allen | 137/616.7 X |
| 1,664,816 | 4/1928 | Hansen | 141/352 X |
| 1,802,523 | 4/1931 | Morangier | 141/352 |
| 2,221,113 | 11/1940 | Schmitt | 239/579 X |
| 4,398,668 | 8/1983 | Jette | 239/578 X |
| 4,674,661 | 6/1987 | Herold | 222/528 X |
| 4,907,630 | 3/1990 | Kulikowski et al. | 141/382 X |
| 4,989,791 | 2/1991 | Ridenour | 239/579 |

FOREIGN PATENT DOCUMENTS 713689 10/1931 France ................................. 137/616

Primary Examiner—Gregory L. Huson
Attorney, Agent, or Firm—Arthur L. Plevy

[57]  ABSTRACT

A hinged nozzle incorporates a valve for permitting or stopping the flow of a liquid wherein the valve is responsive to the movement of a portion of the nozzle. The nozzle includes a spring which provides a motivating force for rotating the portion of the nozzle to a position which closes the valve and thus stops the flow of liquid.

4 Claims, 4 Drawing Sheets

FUEL-DISPENSING NOZZLE FOR DISPENSING HYDROCARBON FUEL

FIELD OF THE INVENTION

The present invention relates to a fuel-dispensing nozzle for dispensing hydrocarbon fuel and designed to be fitted to fuel pumps in service stations.

BACKGROUND OF THE INVENTION

Existing fuel-dispensing nozzles include a certain number of safety systems to prevent fuel from being split on the ground. Mention may be made of mechanisms which interrupt fuel dispensing when a vehicle tank is full and mechanisms which prevent fuel from leaving the nozzle when its spout end is pointing upwards.

These various safety systems generally serve to decouple the actuating lever of the nozzle from a flow control valve which is normally controlled by the lever. Such decoupling is normally obtained by means of a detection channel received inside the spout of the nozzle and having its ends opening out respectively to the end of the spout and in a venturi tube formed between the valve member of the flow control valve and its seat. The flow of fuel through the valve creates suction in the venturi tube which in turn produces a vacuum inside the detection channel as soon as its other end is closed, i.e. when the vehicle tank is full and the fuel level in the vehicle tank rises up to the spout and thus closes the detection channel. A membrane responsive to the pressure inside the channel responds to the vacuum created in this way by moving and causing the mechanical connection between the lever and the valve member to be interrupted. Any action on the lever has no effect on the flow control valve so the flow of fuel is interrupted.

This safety system is generally accompanied by a second valve member located in the detection channel and operating under gravity. When the fuel-dispensing nozzle points upwards, this valve closes the channel automatically by gravity. This closure causes the lever to be decoupled from the valve member of the flow control valve in the same manner as before.

However, in practice, it turns out that these safety systems are sometimes insufficient for preventing an accidental flow of fuel outside a vehicle tank. In particular, it is always possible to obtain a flow of fuel by actuating the lever when the nozzle is pointing downwards and while not engaged in the filling tube of a vehicle tank. In this case, the fuel that is split onto the ground of the filling station causes a nuisance and may give rise to accidents.

SUMMARY OF THE INVENTION

An object of the present invention is to add to these safety systems by providing a fuel-dispensing nozzle for hydrocarbon fuel which is designed in such a manner as to make it impossible to switch on fuel dispensing so long as the spout of the nozzle is not inserted in the filling tube of a vehicle tank, i.e. while the nozzle is moving between the fuel pump and the filling tube of the tank.

According to the invention, this object is achieved by a fuel-dispensing nozzle for hydrocarbon fuel, the nozzle being connected to a hose and being characterized in that is comprises:

a first portion forming a handle and fixed to said hose;
a second portion forming a spout designed to be inserted in a filling tube of a fuel tank, and capable of pivoting about an axis XX' relative to said first portion;
a flow duct passing through each of said portions; and
a valve disposed in said flow duct with opening of the valve being controlled by moving said nozzle portions relative to each other.

Another advantage of the invention is to provide a fuel-dispensing nozzle without a control lever. In prior art nozzles, a user may inadvertently cause fuel to be dispensed by exerting hand pressure on the lever.

In the present invention, the user can still cause fuel to be delivered wrongly while the nozzle is moving between the fuel pump and the tank, but to do this the user must use both hands: one holding the first portion of the nozzle and the other holding the second portion; and the user must exert a force on these nozzle portions in order to obtain relative motion between them. It is highly unlikely that fuel will be delivered wrongfully in this way without the deliberate intention of the user.

BRIEF DESCRIPTION OF THE FIGURES

Other characteristics and advantages of the invention appear more clearly on reading the following description of various embodiments of the invention given by way of non-limiting example. The description refers to the accompanying drawings, in which.

DETAILED DESCRIPTION OF THE INVENTION

Figure 1:
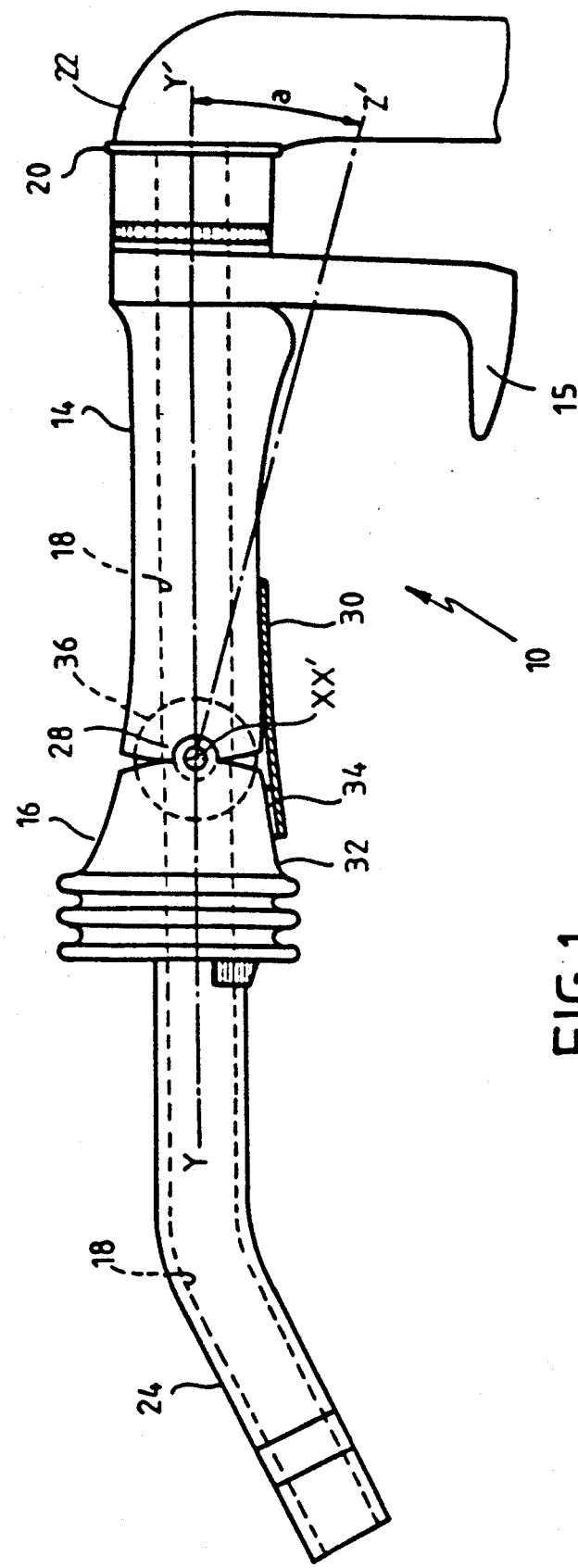
FIG. 1 is a side view of a nozzle of the invention in its rest position.

With reference initially to FIG. 1, a nozzle 10 of the invention comprises first and second portions 14 and 16 with a flow duct 18 passing therethrough, the first portion 14 forming a handle 15. The end of the flow duct 18 situated inside the first portion 14 of the nozzle 10 is designed to be fixed by means of a coupling 20 to a hose 22 whose other end is connected to a fuel pump in a service station. The second portion 16 comprises a spout 24 into which the flow duct 18 opens out at its second portion end, the spout 24 being designed for insertion into the filling tube 26 of a vehicle tank.

The handle-forming first portion 14 and the second portion 16 of the nozzle 10 are hinged to each other about an axis XX' by control means 28.

The two portions 14 and 16 of the nozzle can pivot relative to each other about the axis XX' of the control means 28 through a maximum angle a.

The nozzle 10 of the invention includes a valve 36 whose function is to control fuel dispensing. A plurality of embodiments of the valve 36 are described below. In one embodiment, the valve 36 is disposed at the hinge between the handle-forming first portion 14 and the second portion 16, but it would also be possible to provide a valve situated away from the hinge.

In the embodiment shown in FIG. 1, the nozzle 10 is shown in its rest position, i.e. in the state it occupies when it is still hooked on the fuel pump (not shown), or while it is moving between the fuel pump and a vehicle tank 12. In this rest position, it is not possible to cause fuel to be delivered. As shown in FIG. 1, this rest position corresponds to the portions 14 and 16 of the nozzle 10 being in alignment along the axis YY' coinciding with the axis of the cylinder constituted by the flow duct 18. It would also be possible to design a rest position in which the handle-forming portion 14 and the second portion 16 of the nozzle 10 are at an angle to each other which is less than a.

Return means, e.g. a return spring 30, maintain the portions 14 and 16 of the nozzle 10 in the rest position shown in FIG. 1, which portions thus remain in alignment along the axis YY'. This return spring 30 is fixed to the outside wall 32 of nozzle portion 16 by fixing means 34 such as gluing means or any other means and it overlaps both portions 14 and 16 of the nozzle 10.

The valve 36 is closed while the nozzle portions 14 and 16 are in alignment on the axis YY', i.e. when the nozzle 10 is in its rest position. Since the valve 36 is closed, the fuel inside the flow duct 18 within the nozzle portion 14 is retained and cannot spill into the flow duct 18 within the nozzle portion 16 and thus escape via the end of the spout 24. It is therefore impossible to pour fuel from the spout 24 so long as nozzle portions 14 and 16 remain in the rest position under the effect of the return spring 30, i.e. in the embodiment described, so long as they remain in alignment.

Figure 2:
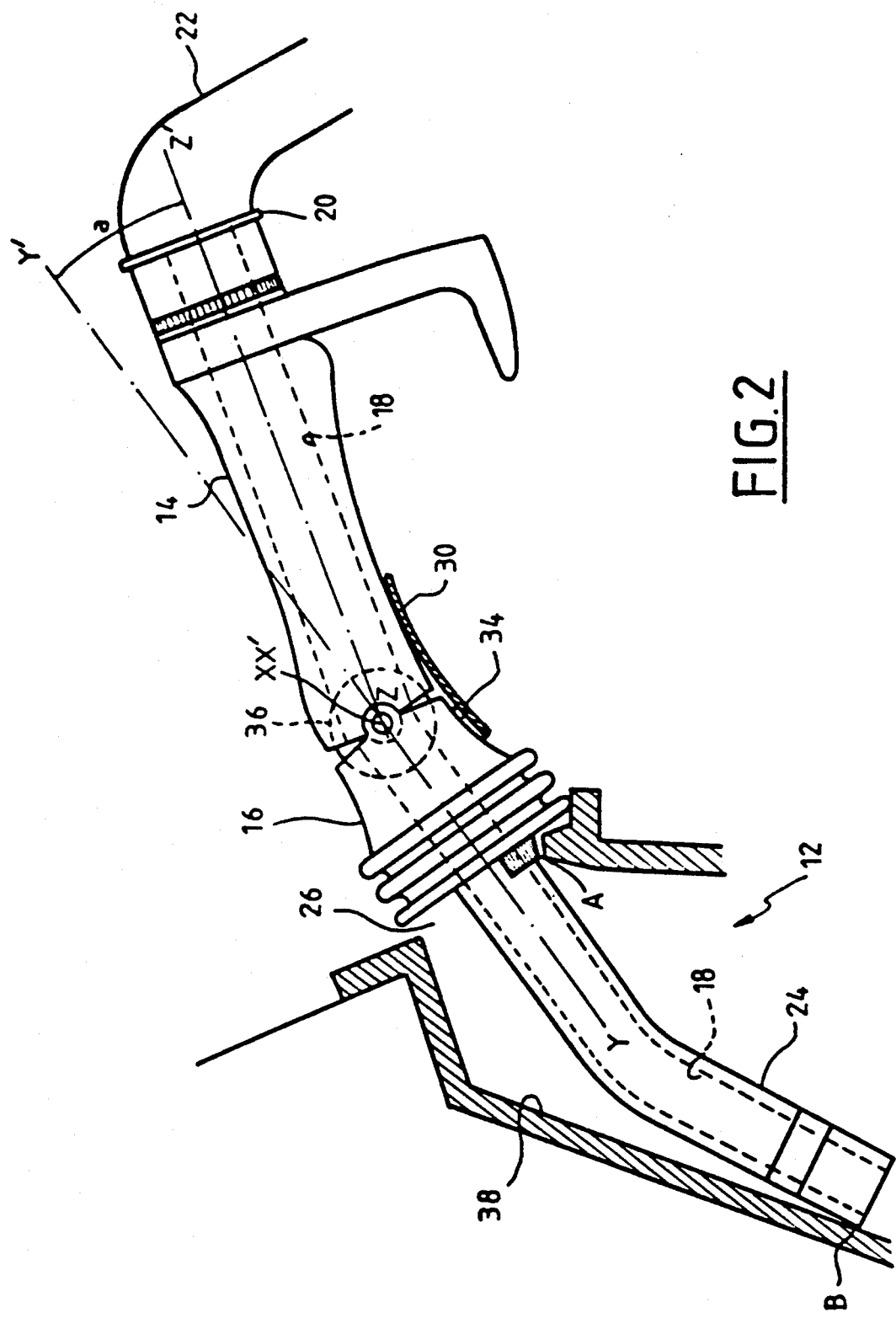
FIG. 2 is a side view of a nozzle of the invention while delivering fuel.

FIG. 2 shows the nozzle 10 of the invention inserted into the filling tube 26 of a vehicle tank 12, with the nozzle being shown while dispensing fuel.

A user seeking to obtain fuel to fill a vehicle tank unhooks a nozzle 10 of the invention from a fuel pump by means of its handle-forming portion 14 which is connected to a hose 22. At this moment, the nozzle 10 is still connected to the fuel pump by a hose 22 via which fuel is to be dispensed. So long as the spout 24 has not been inserted in a tank 12, the nozzle 10 remains in its rest position under thrust from the return spring 30, i.e. in the embodiment described, its portions 14 and 16 remain in alignment. As a result, the valve 36 remains closed, preventing fuel being dispensed. When the nozzle 10 is inserted in a vehicle tank 12 via its filling tube 26, the spout 24 of nozzle portion 16 makes contact at points A and B with the inside wall 38 of the tank 12. With nozzle portion 16 thus held at points A and B of the tank 12, the user holding the nozzle 10 by its portion 14 can cause nozzle portion 14 to pivot through the maximum angle a about the axis XX' by exerting a downward force on portion 14 against the return spring 30. The angle a is the angle which appears between the axis YY' when the nozzle is in the rest position with portions 14 and 16 in alignment, and the axis ZZ' coinciding with the axis of the cylinder constituted by the flow duct 18 in nozzle portion 14 when the user exerts a downward force on the portion 14. In its position where an angle a exists between the axes YY' and ZZ', the nozzle 10 has a valve 36 which is open, thereby enabling fuel to flow into the tank 12 via the spout 24 having the flow duct 18 running therealong. As soon as the user releases the force that was being exerted on nozzle portion 14, e.g. by letting go the portion 14, then the portion 14 moves upwards under the action of the return spring 30 so as to return into alignment with the portion 16 along the axis YY'. Back in its rest position, the nozzle 10 has a valve which is closed, thereby stopping the flow of fuel into the tank 12.

Figure 3:
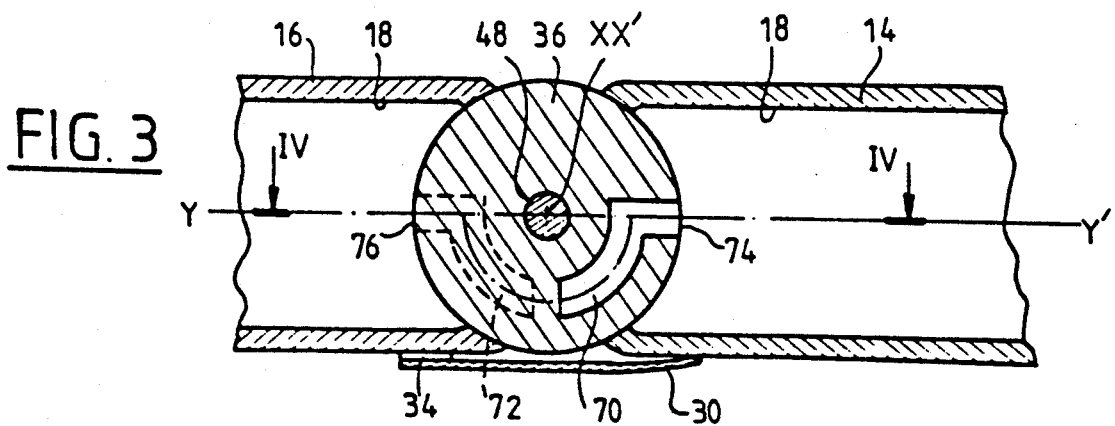
FIG. 3 is a side view in longitudinal section of a first embodiment of the FIG. 1 hinge means.
Figure 4:
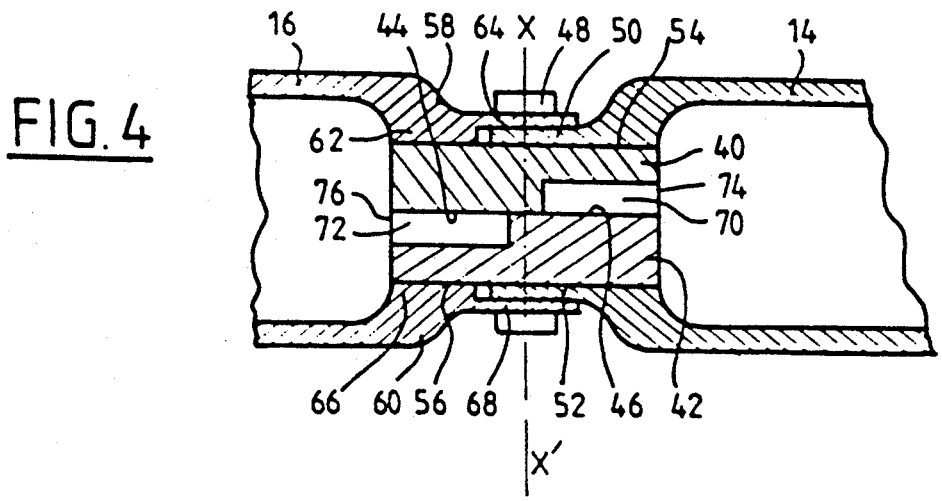
FIG. 4 is a vertical section on line IV—IV of FIG. 3.
Figure 5:
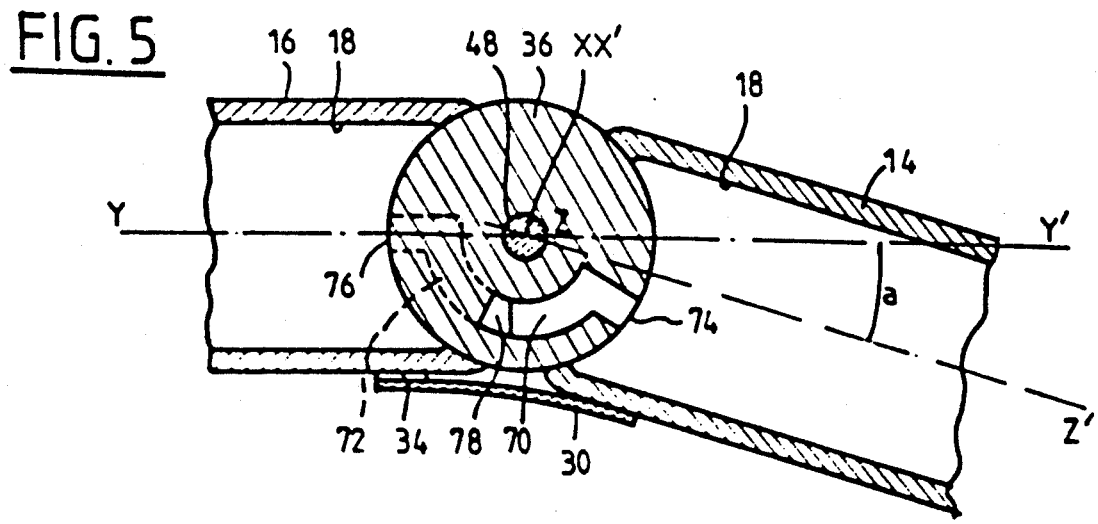
FIG. 5 is a side view in longitudinal section through the first embodiment of the hinge means, shown in operation.

FIGS. 3, 4, and 5 show a first embodiment of the valve 36. In the first embodiment, the valve 36 is constituted by two cylindrical pellets 40 and 42 about the axis XX', and made of ceramics, for example. The plane inside faces 44 and 46 of the pellets 40 and 42 respectively and perpendicular to the axis XX' are pressed against each other in liquid-tight manner by a clamping system 48 which also defines the axis of rotation XX'.

Nozzle portion 14 has two ends 50 and 52 situated on opposite sides of the two pellets 40 and 42 which are pressed against each other. These two ends 50 and 52 are integrated in the clamping system 48 and are suitable for pivoting about the axis of rotation XX' relative to nozzle portion 16. The end 50 of portion 14 is fixed to the plane outer face 54 of pellet 40 by fixing means such as glue. The end 52 is in contact with the plane outer face 56 of the pellet 42 but is free to slide over said face when the portion 14 pivots relative to the portion 16 about the axis XX'.

Nozzle portion 16 has two ends 58 and 60 situated on either side of the two pellets 40 and 42 pressed against each other, with end 58 having two parts 62 and 64, and with end 60 also having two other parts 66 and 68. The two ends 58 and 60 are integrated in the clamping system 48 by means of the part 64 of end 58 and of the part 68 of end 60, and thus are capable of pivoting relative to nozzle portion 14 about the axis of rotation XX'. The part 64 of end 58 is in contact with the end 50 of nozzle portion 14 in the X direction and the part 62 is in contact with the outer plane face 54 of the pellet 40 in such a manner as to enable to part 64 to slide over the end 50, and to enable the part 62 to slide over said face 54 when nozzle portion 14 pivots relative to portion 16 about the axis XX'. The portion 68 of end 60 is in contact with the end 52 of the portion 14 in the X' direction and slides over said end 52 when nozzle portion 14 pivots relative to portion 16 about the axis XX'. End part 66 is fixed to the pellet 42 on its outer plane face 56 by fixing means such as gluing means.

In the inner face 44 of the pellet 40 and in the inner face 46 of the pellet 42 there are two respective blind channels 70 and 72. The open end 74 of channel 70 opens out into the flow duct 18 in nozzle portion 14, while the open end 76 of channel 72 opens out into the flow duct 18 in nozzle portion 16. The blind channels 70 and 72 extend over respective circular arcs about the axis of rotation XX'.

In the rest position shown in FIGS. 3 and 4, the first and second nozzle portions 14 and 16 are in alignment along the axis YY'. As a result the channels 70 and 72 do not overlap. Fuel contained in the flow duct 18 within portion 14 cannot flow into the flow duct 18 within portion 16 since there is no communication between the channels 70 and 72. The valve 36 is therefore closed.

In contrast, when nozzle portions 14 and 16 are at an angle a relative to each other, i.e. when there is an angle between the axes YY' and ZZ' as shown in FIG. 5, then the channels 70 and 72 overlap partially over an interval 78. The portion 14 is caused to pivot relative to the portion 16 about the axis XX' by the downward force exerted by the user on the portion 14 when the spout 24 is inserted in the tank 12. At this moment, since the valve 36 is open, fuel may flow from nozzle portion 14 into portion 16 via the interval 78 where the channels 70 and 72 overlap, thereby establishing communication. As soon as the user releases the force exerted on the portion 14, the nozzle 10 returns to its rest position under the action of the return spring 30. The channels 70 and 72 no longer overlap partially, and the valve 36 is thus closed again.

Figure 6:
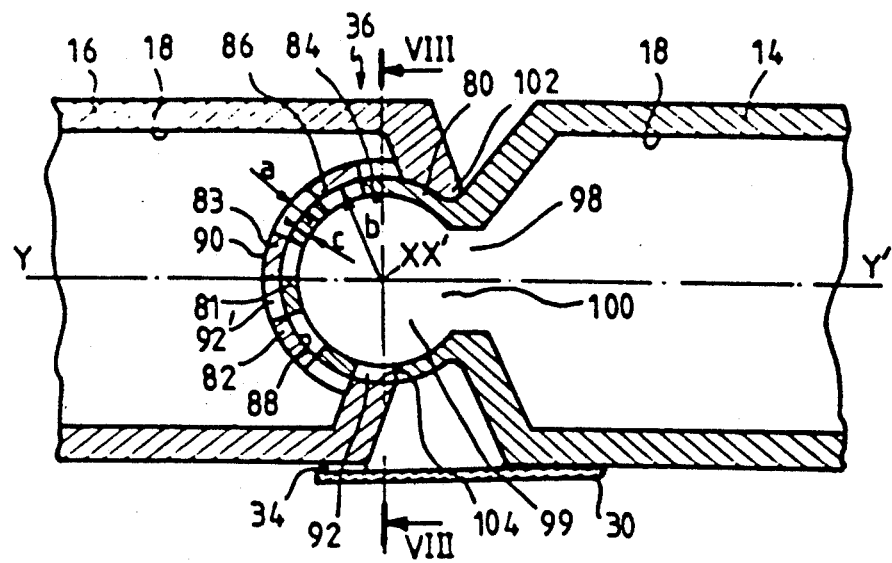
FIG. 6 is a side view in longitudinal section through a second embodiment of the FIG. 1 hinge means.
Figure 7:
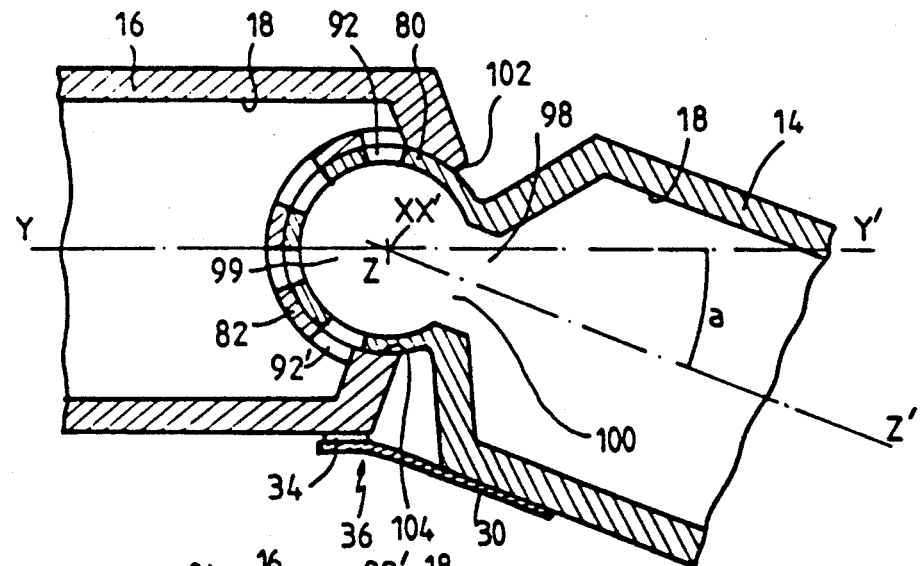
FIG. 7 is a side view in longitudinal section through a second embodiment of the hinge means in operation.
Figure 8:
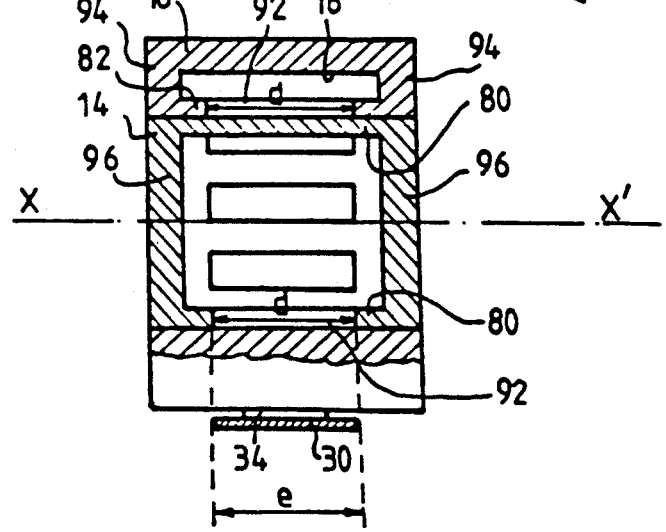
FIG. 8 is a vertical section on line VIII—VIII of FIG. 6.

FIGS. 6, 7, and 8 show a second embodiment of the valve 36. The second embodiment of the valve 36 results from the special shape of the first and second nozzle portions 14 and 16 about the axis XX' of mutual rotation or pivoting between the portions.

The second embodiment of the valve 36 is constituted by two cylinders 80 and 82 which are not closed circularly, these cylinders being concentric hollow right cylinders about the axis XX' having respective inside faces 84 and 88 and respective outside faces 86 and 90.

The cylinder 80 has a slot 98 extending in the direction XX' giving access to the inside 99 of the cylinder 80 from the flow duct 18 in the handle-forming first portion 14.

The cylinder 80 of radius b has a cylindrical wall 81 of thickness c and is integral with nozzle portion 14. The inside face 84 of cylinder 80 faces the end of the flow duct 18 situated in the first nozzle portion 14. The outside face 86 thereof is in contact with the inside face 88 of the cylinder 82.

The cylinder 82 has a slot 100 in the direction XX' enabling the inner cylinder 80 to be received inside the cylinder 82 between lips 102 and 104 of the outer cylinder 82.

The outer cylinder 82 of diameter a+b has a cylindrical wall 83 of thickness a and is integral with nozzle portion 16. Its inside face 88 is in contact with the outside face 86 of the cylinder 80. The inside face of half-cylinder 82 and the outside face 86 of cylinder 80 are suitable for sliding over each other about the axis XX' as explained below. The outside face 90 of the cylinder 82 faces the flow duct 18 situated in the second nozzle portion 16.

The outer cylinder 82 occupies an arc of a circle which is greater than 180°, thereby preventing the cylinders 80 and 82 coming apart in the direction YY'.

The cylindrical walls 81 and 83 of the cylinders 80 and 82 respectively have openings 92 and 92' of length d extending along the direction XX' and spaced apart from one another over respective same-length circular arcs.

The cylinders 80 and 82 have a length e in the direction YY'.

The entire system constituting the valve 36 is fluid-tight, preventing fuel from escaping to the outside because it includes side walls 94 that are perpendicular to the axis XX' and fixed to nozzle portion 16 on either side of half-cylinder 82, and side walls 96 perpendicular to the axis XX', fixed to nozzle portion 14, and on either side of the cylinder 80.

In the rest position shown in FIGS. 6 and 8, the first and second nozzle portions 14 and 16 are in alignment along the axis YY'. In this position the openings 92 in the cylinder 80 and the opening 92' in the cylinder 82 are offset from each other so that they do not overlap. The inside face 88 of cylinder 82 thus overlies each of the openings 92 in the cylinder 80. Fuel in the flow duct 18 within portion 14 cannot flow in to the flow duct 18 within portion 16 since the inside face 88 of cylinder 82 closes each of the openings 92 in cylinder 82, thereby preventing any communication. The valve 36 is therefore closed.

In contrast, when nozzle portions 14 and 16 are at an angle a to each other, i.e. when there is an angle between the axes YY' and ZZ' as shown in FIG. 7, then the openings 92 of the cylinder 80 overlie the openings 92' of the cylinder 82. The openings 92 and 92' are caused to overlap by sliding the outside face 86 of the cylinder 80 over the inside face 88 of the half-cylinder 82. This sliding with contact is caused by the portion 14 pivoting relative to the portion 16 about the axis XX', and serves to solve sealing problems. This pivoting is obtained by the user forcing the portion 14 downwards when the spout 24 is inserted in the tank 12. At this moment, since the valve 36 is open, fuel may flow from nozzle portion into nozzle portion 16 since the openings 92 of cylinder 80 overlap the openings 92' of the cylinder 82. Compared with the first embodiment, the advantage of this second embodiment of the valve is that a larger flow section is obtained via the openings 92 and 92', thereby enabling a higher fuel flow rate to be obtained. As soon as the user releases the force that was being exerted on the portion 14, the nozzle 10 returns to its rest position under the action of the return spring 30. The openings 92 and 92' of the half-cylinders 80 and 82 no longer overlap and the valve 36 is therefore closed again.

We claim:

1. A fuel dispensing system for delivering fuel into a fuel tank having a filling tube, said system including a hose for providing hydrocarbon fuel and a fuel dispensing nozzle, said nozzle comprising:
    an inlet portion having a handle and fixed to said hose;
    a discharge portion formed as a spout adapted to be inserted in said filling tube;
    pivoting means affixed between said inlet portion and said discharge portion for pivoting said discharge portion relative to said inlet portion;
    flow duct means passing through said inlet portion and said discharge portion for permitting fuel flow;
    valve means affixed within said flow duct means for permitting said fuel flow through said flow duct means when said inlet portion and said discharge portion are in a first pivotal position and for interrupting said fuel flow through said flow duct means when said inlet portion and said outlet portion are in a second pivotal position; and
    biasing means for maintaining said inlet portion and said discharge portion in said second portion after interrupting said fuel flow in said first position.

2. The nozzle according to claim 1, wherein said biasing means is a leaf spring positioned adjacent said pivot means, said spring affixed to said inlet portion and contacting said discharge portion and operative to bias said discharge portion in said first position when said discharge portion is selectively moved to said first position and to maintain said discharge portion in said second position when said discharge portion is not in said first position.

3. The nozzle according to claim 1, wherein said valve means includes:
    a lower disc shaped element affixed in said discharge portion, said lower element including a first groove open to said discharge portion flow duct means and ending within said lower element;
    an upper disc shaped element affixed in said inlet portion, said upper element including a second groove open to said inlet portion flow duct means and ending within said upper element, said upper element being rotatably mounted on said lower element such that said first groove and second groove overlap when said discharge portion is selectively moved to said first position thereby forming a passageway enabling said fuel to flow from said inlet conduit to said discharge conduit and when said discharge portion is selectively moved to said second position said first groove and said second groove do not overlap and said fuel flow stops.

4. The nozzle according to claim 1, wherein said inlet portion includes an inlet end and said discharge portion includes a discharge end and said control valve means includes:

a cylindrically shaped end opposite said inlet end, said cylindrically shaped end having a first plurality of slots open to said inlet portion flow duct means;

a socket shaped end opposite said discharge end, said socket shaped end having a second plurality of slots open to said discharge portion flow duct means said cylindrically shaped end rotatably affixed within said socket end such that said first slots and said second slots overlap when said discharge portion is selectively moved to said first position thereby forming a passageway enabling said fuel to flow from said inlet conduit to said discharge conduit and wherein when said discharge portion is selectively moved to said second position said first slots and said second slots do no overlap and said fuel flow stops.

* * * * *